United States Patent
Dong et al.

(10) Patent No.: US 10,200,469 B2
(45) Date of Patent: Feb. 5, 2019

(54) METHOD AND SYSTEM FOR INFORMATION SYNCHRONIZATION BETWEEN CLOUD STORAGE GATEWAYS, AND CLOUD STORAGE GATEWAY

(71) Applicant: Huawei Technologies Co., Ltd., Shenzhen, Guangdong (CN)

(72) Inventors: Feng Dong, Nanjing (CN); Wei Zhang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 559 days.

(21) Appl. No.: 14/522,418

(22) Filed: Oct. 23, 2014

(65) Prior Publication Data

US 2015/0142866 A1     May 21, 2015

(30) Foreign Application Priority Data

Nov. 15, 2013   (CN) .......................... 2013 1 0573217

(51) Int. Cl.
| | |
|---|---|
| *G06F 15/16* | (2006.01) |
| *H04L 29/08* | (2006.01) |
| *G06F 17/30* | (2006.01) |

(52) U.S. Cl.
CPC .... *H04L 67/1095* (2013.01); *G06F 17/30197* (2013.01); *G06F 17/30575* (2013.01); *H04L 67/1097* (2013.01)

(58) Field of Classification Search
CPC ......... G06F 17/30197; G06F 17/30575; H04L 67/1095; H04L 67/00; H04L 67/1097

(Continued)

(56) References Cited

U.S. PATENT DOCUMENTS 8,316,237 B1 * 11/2012 Felsher ................. H04L 9/0825
                                                                  380/282
9,355,120 B1 *  5/2016 Slik .................... G06F 17/30221
(Continued)

FOREIGN PATENT DOCUMENTS

CA       2864378 A1    8/2013
CN       1605072 A     4/2005
(Continued)

OTHER PUBLICATIONS

Harry Newton, Newton's Telecom Dictionary, 2006, Publisher: CMP Books, 22nd edition.*

(Continued)

*Primary Examiner* — SM A Rahman
(74) *Attorney, Agent, or Firm* — Leydig, Voit & Mayer, Ltd.

(57) ABSTRACT

The application discloses a method and a system for information synchronization between cloud storage gateways and a cloud storage gateway, to resolve a problem that an address obtained by a cloud storage gateway is usually a dynamic address or even a private address, and it is difficult to perform direct communication and impossible to perform directory synchronization. A cloud storage gateway obtains, from a cloud message queue of a cloud service provider, a directory distributed by another cloud storage gateway; and therefore, as long as the cloud storage gateway can communicate with the cloud service provider, directory synchronization can be implemented without a need of direct communication between the cloud storage gateways. Therefore, even through an address obtained by the cloud storage gateway is a dynamic address or a private address, directory synchronization is not affected.

19 Claims, 12 Drawing Sheets

(58) Field of Classification Search
USPC .......................................................... 709/201
See application file for complete search history.

(56) References Cited

U.S. PATENT DOCUMENTS

| | | |
|---|---|---|
| 2005/0038874 A1 | 2/2005 | Ramaswamy et al. |
| 2005/0108556 A1* | 5/2005 | DeMello ................. G06F 21/10 |
| | | 713/189 |
| 2007/0143252 A1 | 6/2007 | Toorn |
| 2008/0104277 A1 | 5/2008 | Tian |
| 2009/0287837 A1* | 11/2009 | Felsher ................. G06F 19/328 |
| | | 709/229 |
| 2010/0325153 A1 | 12/2010 | Thakkar et al. |
| 2011/0251992 A1* | 10/2011 | Bethlehem .......... H04L 12/2863 |
| | | 707/610 |
| 2013/0262385 A1* | 10/2013 | Kumarasamy .... G06F 17/30082 |
| | | 707/634 |
| 2014/0047498 A1* | 2/2014 | Malegaonkar ...... H04L 67/1097 |
| | | 726/1 |
| 2016/0150047 A1* | 5/2016 | O'Hare ................. G06F 3/0619 |
| | | 713/168 |
| 2017/0086816 A1 | 3/2017 | Norton |

FOREIGN PATENT DOCUMENTS

| | | |
|---|---|---|
| CN | 1956452 A | 5/2007 |
| CN | 101068245 A | 11/2007 |
| CN | 102024005 A | 4/2011 |
| CN | 102460436 A | 5/2012 |
| CN | 202872848 U | 4/2013 |
| WO | WO 02076003 A2 | 9/2002 |

OTHER PUBLICATIONS

Saroiu et al., "Measuring and analyzing the characteristics of Napster and Gnutella hosts," Multimedia Systems, vol. 9, pp. 170-184, Springer-Verlag GmbH, Berlin, Germany (2003).

* cited by examiner

METHOD AND SYSTEM FOR INFORMATION SYNCHRONIZATION BETWEEN CLOUD STORAGE GATEWAYS, AND CLOUD STORAGE GATEWAY

CROSS-REFERENCE TO RELATED APPLICATION

This application claims priority to Chinese Patent Application No. 201310573217.7, filed on Nov. 15, 2013, which is hereby incorporated by reference in its entirety.

TECHNICAL FIELD

The present invention relates to the field of communications technologies, and in particular, to a method and a system for information synchronization between cloud storage gateways, and a cloud storage gateway.

BACKGROUND

For an enterprise with a plurality of branches, in a distributed deployment scenario, generally one cloud storage gateway is deployed in each branch of the enterprise and the plurality of branches shares and uses one cloud service provider. Each cloud storage gateway generally merges a locally stored directory and a cloud storage directory into one directory and presents the merged directory to users in each branch, so that content seen by the users in each branch is inconsistent and directories of the cloud storage gateways need to be synchronized.

Currently, directory synchronization between the cloud storage gateways of the branches is implemented by means of direct communication. Therefore, it is required that the cloud storage gateway of each branch is directly reachable, and for the cloud storage gateway of each branch, a fixed public Internet Protocol (IP) address needs to be assigned, or a data connection is established via a virtual private network (VPN).

However, in an actual deployment environment of a small- to medium-sized enterprise, an address obtained by a cloud storage gateway is usually a dynamic address or even a private address, which makes it difficult to perform direct communication and impossible to perform directory synchronization.

SUMMARY

In view of this, an objective of embodiments of the present invention is to provide a method and a system for information synchronization between cloud storage gateways and a cloud storage gateway, to resolve the foregoing problem.

To achieve the foregoing objective, the embodiments of the present invention provide the following technical solutions:

A first aspect of an embodiment of the present invention provides a method for information synchronization between cloud storage gateways, including:

obtaining, by a first cloud storage gateway and from a cloud message queue of a cloud service provider, a first directory message distributed by a second cloud storage gateway, where the first directory message includes a directory of the second cloud storage gateway and a gateway identifier of the second cloud storage gateway;

obtaining, by the first cloud storage gateway, a cloud storage directory; and merging, by the first cloud storage gateway, a directory of the first cloud storage gateway, the directory of the second cloud storage gateway, and the cloud storage directory into one directory, and displaying the directory.

With reference to the first aspect, in a first possible implementation manner, the method further includes:

sending, by the first cloud storage gateway, a first download request message to the cloud message queue, where the first download request message includes an identifier of a first target object and a gateway identifier of a gateway to which the first target object belongs;

obtaining, by the first cloud storage gateway, a first download link message from the cloud message queue, where the first download link message includes a download link corresponding to the first target object, and sending, by the gateway to which the first target object belongs, the first download link message to the cloud message queue according to the first download request message; and downloading, by the first cloud storage gateway, the first target object according to the download link corresponding to the first target object.

With reference to the first possible implementation manner of the first aspect, in a second possible implementation manner, wherein the first target object is an encrypted file, and the method further includes:

distributing, by the first cloud storage gateway, a first decryption request message to the cloud message queue, wherein the first decryption request message is used to request a decryption manner of the first target object;

obtaining, by the first cloud storage gateway, a first decryption response message from the cloud message queue, wherein the first decryption response message comprises the decryption manner of the first target object; and decrypting, by the first cloud storage gateway, the first target object according to the decryption manner of the first target object in the first decryption response message.

With reference to the first aspect, in a third possible implementation manner, the method further includes: distributing, by the first cloud storage gateway, a second directory message to the cloud message queue, where the second directory message includes the directory of the first cloud storage gateway and a gateway identifier of the first cloud storage gateway.

With reference to the third possible implementation manner of the first aspect, in a fourth possible implementation manner, the method further includes:

obtaining, by the first cloud storage gateway, a second download request message from the cloud message queue, where the second download request message includes an identifier of a second target object and the gateway identifier of the first cloud storage gateway;

uploading, by the first cloud storage gateway, the second target object to the cloud service provider; and sending, by the first cloud storage gateway, a second download link message to the cloud message queue, where the second download link message includes a download link corresponding to the second target object.

With reference to the fourth possible implementation manner of the first aspect, in a fifth possible implementation manner, the second target object is an encrypted file; and the method further includes:

obtaining, by the first cloud storage gateway, a decryption request message from the cloud message queue, where the decryption request message is used to request a decryption manner of the second target object;

sending, by the first cloud storage gateway, a deleting instruction to the cloud service provider to delete the second target object; and sending, by the first cloud storage gateway, a decryption response message to the cloud message queue, where the decryption response message includes the decryption manner of the second target object.

With reference to the fourth possible implementation manner of the first aspect, in a sixth possible implementation manner, the second target object is an encrypted file; and the method further includes:

setting, by the first cloud storage gateway, an expiration time for the download link corresponding to the second target object, so that the download link corresponding to the second target object becomes invalid after the expiration time.

With reference to the third possible implementation manner of the first aspect, in a seventh possible implementation manner, the distributing by the first cloud storage gateway the second directory message to the cloud message queue includes:

distributing, by the first cloud storage gateway, the second directory message to the cloud message queue under a trigger condition; wherein, the trigger condition comprises one or a combination of the following:

a directory of the first cloud storage gateway changes;

the first cloud storage gateway is powered on; and a directory distributing request of another cloud storage gateway is received.

A second aspect of an embodiment of the present invention provides a cloud storage gateway, including:

a first obtaining unit, configured to obtain, from a cloud message queue of a cloud service provider, a first directory message distributed by a second cloud storage gateway, where the first directory message includes a directory of the second cloud storage gateway and a gateway identifier of the second cloud storage gateway;

a second obtaining unit, configured to obtain a cloud storage directory; and a merging unit, configured to merge a directory of a first cloud storage gateway, the directory of the second cloud storage gateway, and the cloud storage directory into one directory, and display the directory.

With reference to the second aspect, in a first possible implementation manner, the cloud storage gateway further includes:

an object request distributing unit, configured to send a first download request message to the cloud message queue, where the first download request message includes an identifier of a first target object and a gateway identifier of a gateway to which the first target object belongs;

a third obtaining unit, configured to obtain a first download link message from the cloud message queue, where the first download link message includes a download link corresponding to the first target object, and the first download link message is sent to the cloud message queue by the gateway to which the first target object belongs according to the first download request message; and a downloading unit, configured to download the first target object according to the download link corresponding to the first target object.

With reference to the first possible implementation manner of the second aspect, in a second possible implementation manner, the cloud storage gateway further includes:

a decryption request distributing unit, configured to distribute a first decryption request message to the cloud message queue, wherein the first decryption request message is used to request a decryption manner of the first target object; and a decryption manner obtaining unit, configured to obtain a first decryption response message from the cloud message queue, wherein the first decryption response message comprises the decryption manner of the first target object, and decrypt the first target object according to the decryption manner of the first target object in the first decryption response message.

With reference to the second aspect, in a third possible implementation manner, the cloud storage gateway further includes:

a directory distributing unit, configured to distribute a second directory message to the cloud message queue, where the second directory message includes the directory of the first cloud storage gateway and a gateway identifier of the first cloud storage gateway;

a fourth obtaining unit, configured to obtain a second download request message from the cloud message queue, where the second download request message includes an identifier of a second target object and the gateway identifier of the first cloud storage gateway;

an uploading unit, configured to upload the second target object to the cloud service provider; and a download link distributing unit, configured to send a second download link message to the cloud message queue, where the second download link message includes a download link corresponding to the second target object.

With reference to the third possible implementation manner of the second aspect, in a fourth possible implementation manner, the cloud storage gateway further includes:

a fifth obtaining unit, configured to obtain a second decryption request message from the cloud message queue, where the second decryption request message is used to request a decryption manner of the second target object;

a deleting instruction sending unit, configured to send a deleting instruction to the cloud service provider to delete the second target object; and a decryption manner sending unit, configured to send a second decryption response message to the cloud message queue, where the second decryption response message includes the decryption manner of the second target object.

With reference to the third possible implementation manner of the second aspect, in a fifth possible implementation manner, the directory distributing unit, specifically configured to distribute the second directory message to the cloud message queue under a trigger condition; wherein, the trigger condition comprises one or a combination of the following:

a directory of the cloud storage gateway changes;

the cloud storage gateway is powered on; and a directory distributing request of another cloud storage gateway is received.

A third aspect of an embodiment of the present invention provides a system for information synchronization, including a first cloud storage gateway and a second storage gateway, where:

the first cloud storage gateway includes:

a first obtaining unit, configured to obtain, from a cloud message queue of a cloud service provider, a first directory message distributed by the second cloud storage gateway, where the first directory message includes a directory of the second cloud storage gateway and a gateway identifier of the second cloud storage gateway;

a second obtaining unit, configured to obtain a cloud storage directory; and a merging unit, configured to merge a directory of the first cloud storage gateway, the directory of the second cloud storage gateway, and the cloud storage directory into one directory, and display the directory;

the second cloud storage gateway includes:

a distributing unit, configured to send the first directory message to the cloud message queue.

It can be seen that, in the embodiment of the present invention, a cloud storage gateway obtains, from a cloud message queue of a cloud service provider, a directory distributed by another cloud storage gateway. Therefore, as long as the cloud storage gateway can communicate with the cloud service provider, directory synchronization can be implemented without a need of direct communication between the cloud storage gateways. Therefore, even through an addresses obtained by the cloud storage gateway is a dynamic address or a private address, directory synchronization is not affected.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiment obtained by a person of ordinary skill in the art based on the embodiments of the present invention without creative efforts shall fall within the protection scope of the present invention.

Figure 1:
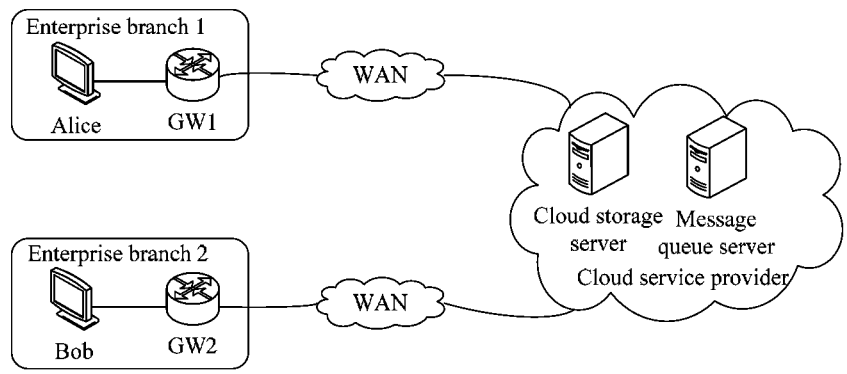
FIG. 1 is a schematic diagram of networks for distributed cloud storage gateways according to an embodiment of the present invention.

Referring to FIG. 1, FIG. 1 is a schematic diagram of networks for distributed cloud storage gateways according to an embodiment of the present invention. As shown in FIG. 1, each of a branch 1 and a branch 2 of an enterprise is deployed with a cloud storage gateway, namely, a GW 1 (a first cloud storage gateway) and a GW 2 (a second cloud storage gateway), and the branch 1 and the branch 2 share a same cloud service provider.

A cloud service provider can provide a cloud storage service, some cloud service providers can also provide a queue service, such as Amazon SQS (simple queue service), and some cloud service providers do not provide any queue service. A cloud service provider provides an API (application programming interface) externally, and a related service can be used via the API. More specifically, when a cloud service provider provides both a cloud storage service and a queue service, APIs provided by the cloud service provider externally may be logically classified into two types: a cloud storage interface and a cloud message queue interface. When a cloud service provider provides a cloud storage service but does not provide a queue service, the cloud service provider provides a cloud storage interface externally.

Still referring to FIG. 1, in terms of architecture, a cloud service provider provides a cloud storage service by using a cloud storage server and provides a queue service by using a queue server.

The technical solutions of the present invention are described below in details with reference to FIG. 1.

Figure 2:
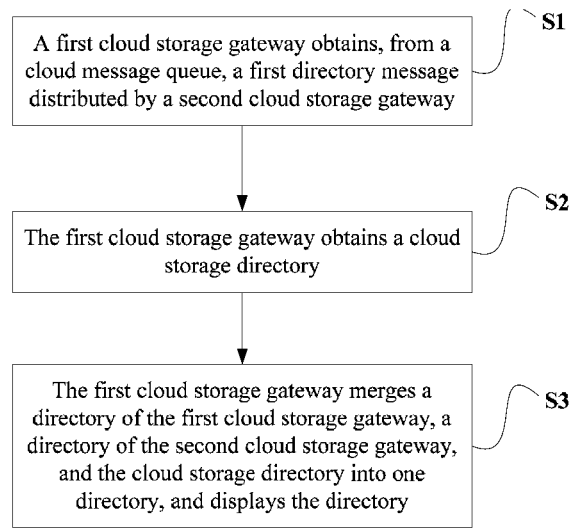
FIG. 2 is a flowchart of a method for information synchronization between cloud storage gateways according to an embodiment of the present invention.

Referring to FIG. 2, FIG. 2 is a flowchart of a method for information synchronization between cloud storage gateways according to an embodiment of the present invention. The method may at least include the following steps:

S1. A first cloud storage gateway obtains, from a cloud message queue of a cloud service provider, a first directory message distributed by a second cloud storage gateway, where the first directory message may include a directory of the second cloud storage gateway (a distributing party of the first directory message) and a gateway identifier of the second cloud storage gateway.

The foregoing gateway identifier may be a gateway name, a gateway address, a MAC (media access control) address, a machine name, or the like, as long as the cloud storage gateway can be uniquely identified.

Step S1 may be performed periodically, or performed according to a user instruction. The second cloud storage gateway may refer to another cloud storage gateway except the first cloud storage gateway, and "the first" and "the second" are used only for differentiation.

Further, the cloud message queue may be implemented in different manners As described above, some cloud service providers provide a message queue service; in this case, the cloud message queue may be implemented by simply renting an existing queue service from a cloud service provider. That is, the cloud message queue is stored in and maintained by a queue server. Various messages distributed to the cloud message queue are distributed through a cloud message queue interface.

In the case that the cloud service provider does not provide a queue service or a queue service provided by the cloud service provider is not used, a cloud message queue may be simulated by using a shared cache file. In this case, a message may be transmitted through a cloud storage interface. That is, the cloud message queue is stored in and maintained by a cloud storage server.

S2. The first cloud storage gateway obtains a cloud storage directory.

Content of the cloud storage directory includes a file list of files stored by an enterprise in the cloud service provider (a cloud storage server). The cloud storage directory is maintained by the cloud storage server, and the first cloud storage gateway may obtain the cloud storage directory via an API (cloud storage interface).

S3. Merge a directory of the first cloud storage gateway, the directory of the second cloud storage gateway, and the cloud storage directory into one directory, and display the directory.

The first directory message is similar to a broadcast message, and therefore may be read by any other cloud storage gateway. A first download request message, a second download request message, and the like introduced below are similar to a unicast message.

To achieve a broadcasting effect, the first directory message may include a source address but not a destination address. Content of the source address is a gateway identifier of a message distributing party. Using the first directory message distributed by the GW1 as an example, the source address of the first directory message is a gateway identifier (a gateway name, a gateway address, a MAC address, or a machine name) of the GW1.

To achieve a unicasting effect, the first download request message, the second download request message, or the like introduced below may include a source address and a destination address, where content of the source address is a gateway identifier of a message distributing party and content of the destination address is a gateway identifier of a target party.

The foregoing source address and destination address may be placed in a message header of a message. In addition, a bit in the message header may also be occupied to indicate whether the message is a broadcasting message. For example, a value of the bit being 1 indicates a broadcasting message, and the value of the bit being 0 indicates a unicasting message.

Certainly, one or more bits in the message header may be occupied to indicate a type of the message. Message types may include a first directory message, a second directory message, a download link message, a first download request message, a second download request message, a download completion message, a decryption request message, a decryption message, and the like.

When obtaining the first directory message or another message, the first cloud storage gateway may download the entire message and read the message header, or may download only the message header and determine whether the message is a desired message according to the message header. Specifically:

After downloading the entire message, the first cloud storage gateway reads the message header, and determines whether the message is a desired message; if the message is not a desired message, the first cloud storage gateway discards the message; if the message is a desired message, the first cloud storage gateway parses the other parts of the message.

Alternatively, the first cloud storage gateway downloads the message header, and determines whether the message is a desired message; if the message is a desired message, the first cloud storage gateway downloads the other parts of the message and performs processing such as parsing; if the message is not a desired message, the first cloud storage gateway discards the message header.

In this embodiment, a cloud storage gateway obtains, from a cloud message queue of a cloud service provider, a directory distributed by another cloud storage gateway; and therefore, as long as the cloud storage gateway can communicate with the cloud service provider, directory synchronization can be implemented without a need of direct communication between the cloud storage gateways. Even through an address obtained by the cloud storage gateway is a dynamic address or a private address, directory synchronization is not affected, thereby resolving a problem that it is difficult for the cloud storage gateways of branches to perform direct communication and directory synchronization cannot be implemented.

Figure 3:
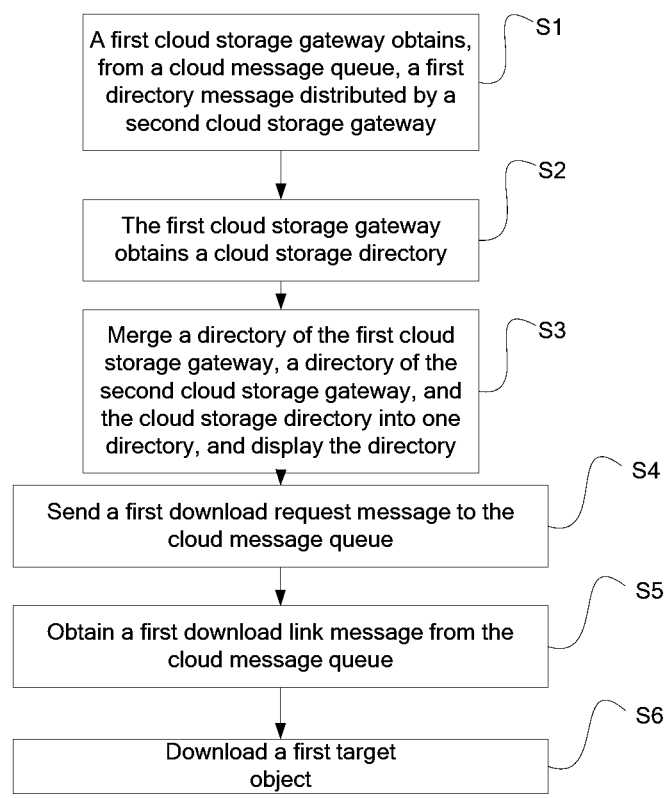
FIG. 3 is another flowchart of a method for information synchronization between cloud storage gateways according to an embodiment of the present invention.

In another embodiment of the present invention, referring to FIG. 3, the foregoing method may further include the following steps:

S4. The first cloud storage gateway sends a first download request message to the foregoing cloud message queue, where the foregoing first download request message includes an identifier of a first target object and a gateway identifier of a gateway to which the first target object belongs.

The gateway identifier of the gateway to which the foregoing first target object belongs may serve as a destination address of the message. In this way, another gateway may determine whether to process the message according to the destination address.

S5. The first cloud storage gateway obtains a first download link message from the cloud message queue.

The gateway to which the first target object belongs sends the first download link message to the cloud message queue according to the first download request message.

The first download link message includes a download link corresponding to the first target object. It should be noted that, the first target object has been uploaded to the cloud storage server, and therefore the download link included in the first download link message corresponds to a location in which the foregoing first target object is stored in the cloud storage server. The download link identifies a download portal of the first target object, which is similar to a URL (uniform resource locator).

Further, the download link may be a temporary link, the first cloud storage gateway may set an expiration time for the download link, and the download link becomes invalid after the expiration time. However, the first target object remains in the cloud storage server.

After the download link becomes invalid, another cloud storage gateway may distribute a message to the cloud message queue, to request the first cloud storage gateway to re-distribute a new temporary download link.

S6. Download the first target object according to the download link corresponding to the first target object.

Figure 4:
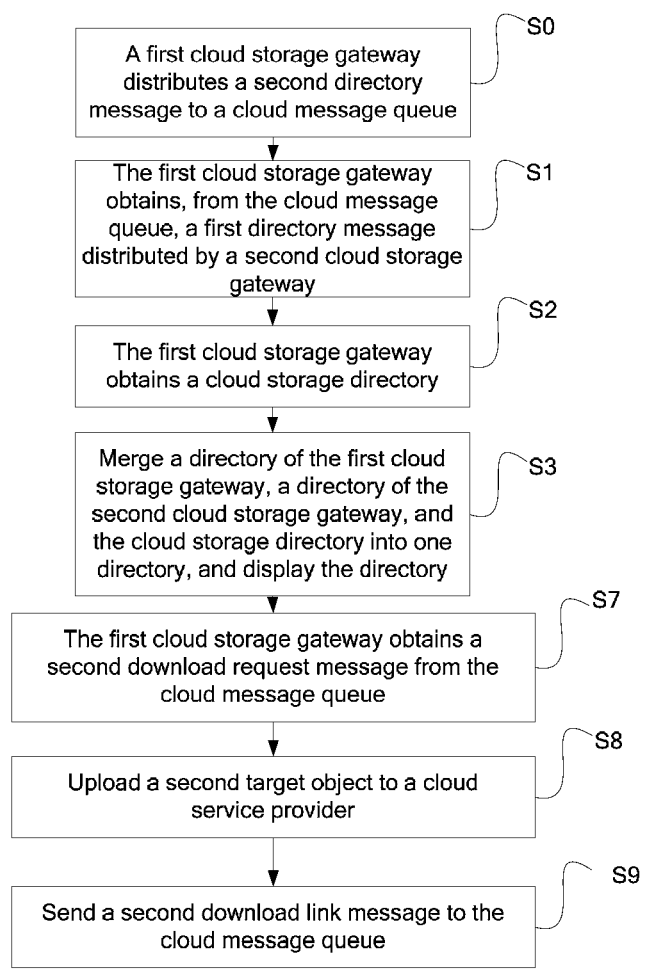
FIG. 4 is still another flowchart of a method for information synchronization between cloud storage gateways according to an embodiment of the present invention.

In another embodiment of the present invention, referring to FIG. 4, the foregoing method for information synchronization between cloud storage gateways may further include the following steps:

S0. The first cloud storage gateway sends a second directory message to the cloud message queue, where the second directory message includes the directory of the first cloud storage gateway and a gateway identifier of the first cloud storage gateway.

"The first" and "the second" in the first directory message and the second directory message are only for differentiation.

Step S0 may be performed periodically, or performed when a trigger condition is met. Moreover, there is no chronological order between step S0 and steps S1 to S3.

The trigger condition may include one or a combination of the following:

a directory changes;

the first cloud storage gateway is powered on; and a directory distributing request of another cloud storage gateway or device is received.

In this embodiment, the first cloud storage gateway distributes the second directory message to the cloud message queue, and obtains the first directory message distributed by another cloud storage gateway to obtain a directory. Alternatively, the same first directory message or the second directory message may be obtained by a plurality of cloud storage gateways.

Further, still referring to FIG. 4, the method may further include:

S7. The first cloud storage gateway obtains a second download request message from the cloud message queue.

The second download request message includes an identifier of a second target object and the gateway identifier of the first cloud storage gateway.

"The first" and "the second" in the first download request message and the second download request message are only for differentiation.

The first download request message is sent by another cloud storage gateway except the first cloud storage gateway, for example, sent by the second cloud storage gateway.

S8. The first cloud storage gateway uploads the second target object to the cloud service provider.

More specifically, the foregoing second target object is uploaded to the cloud storage server through a cloud storage interface.

S9. The first cloud storage gateway sends a second download link message to the cloud message queue.

The second download link message includes a download link corresponding to the second target object. Because the first cloud storage gateway has uploaded the second target object to the cloud storage server, the download link included in the second download link message corresponds to a location in which the second target object is stored in the cloud storage server. The download link identifies a download portal of the second target object, which is similar to a URL.

In another embodiment of the present invention, after step S6, the following step may further be performed:

distribute a download completion message to the foregoing cloud message queue.

Correspondingly, after step S9, the following step may further be performed:

after the download completion message distributed by a sending party of the second download request message is obtained, send a deleting instruction to delete the second target object stored by the cloud service provider.

The deleting instruction is sent through the cloud storage interface.

The first download request message, the first download link message, the second download link message, and the download completion message are similar to a unicast message, content of which may include a source address and a destination address.

In another embodiment of the present invention, to improve security, the first target object and the second target object uploaded in all of the foregoing embodiments may be encrypted files.

Figure 5:
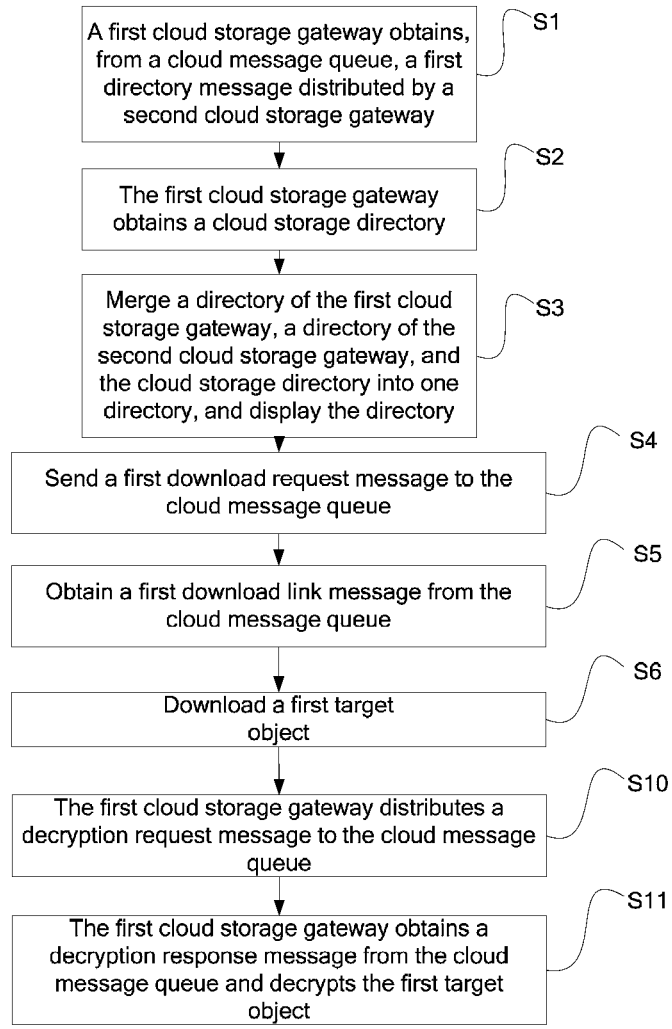
FIG. 5 is yet another flowchart of a method for information synchronization between cloud storage gateways according to an embodiment of the present invention.

Referring to FIG. 5, after step S6, the foregoing method may further include the following steps:

S10. The first cloud storage gateway distributes a decryption request message to the cloud message queue. The decryption request message is used to request a decryption manner of the first target object.

S11. The first cloud storage gateway obtains a decryption response message from the cloud message queue and decrypts the first target object.

Figure 6:
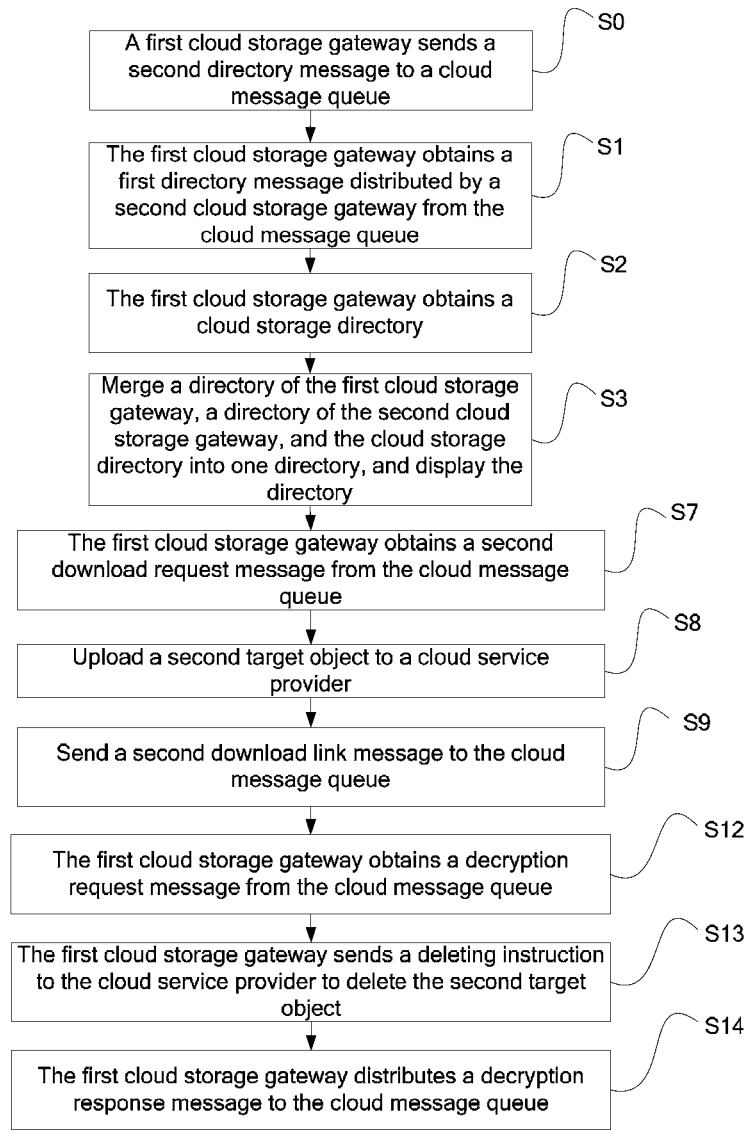
FIG. 6 is still yet another flowchart of a method for information synchronization between cloud storage gateways according to an embodiment of the present invention.

In another embodiment of the present invention, referring to FIG. 6, after step S9, the foregoing method may further include the following steps:

S12. The first cloud storage gateway obtains a decryption request message from the cloud message queue. The decryption request message is used to request a decryption manner of the second target object.

S13. The first cloud storage gateway sends a deleting instruction to the cloud service provider to delete the second target object.

S14. The first cloud storage gateway distributes a decryption response message to the foregoing cloud message queue.

The foregoing decryption response message includes the decryption manner of the second target object, and therefore an obtaining party of the decryption response message may obtain the decryption manner, and decrypt the second target object.

Apparently, for the sake of a security requirement, in this embodiment, the download link message, the decryption request message, and the decryption message are similar to a unicast message, which needs to include a source address and a destination address. Content of the source address includes a gateway identifier of a message sending party and content of the destination address includes a gateway identifier of a message receiving party.

Figure 7:
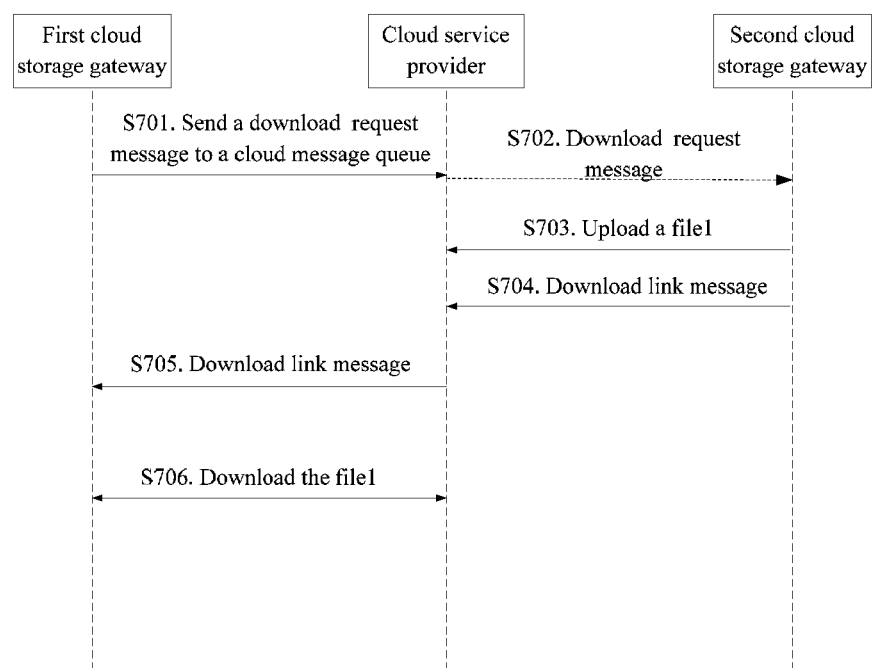
FIG. 7 is an interaction flowchart of a method for information synchronization between cloud storage gateways according to an embodiment of the present invention.
Figure 8:
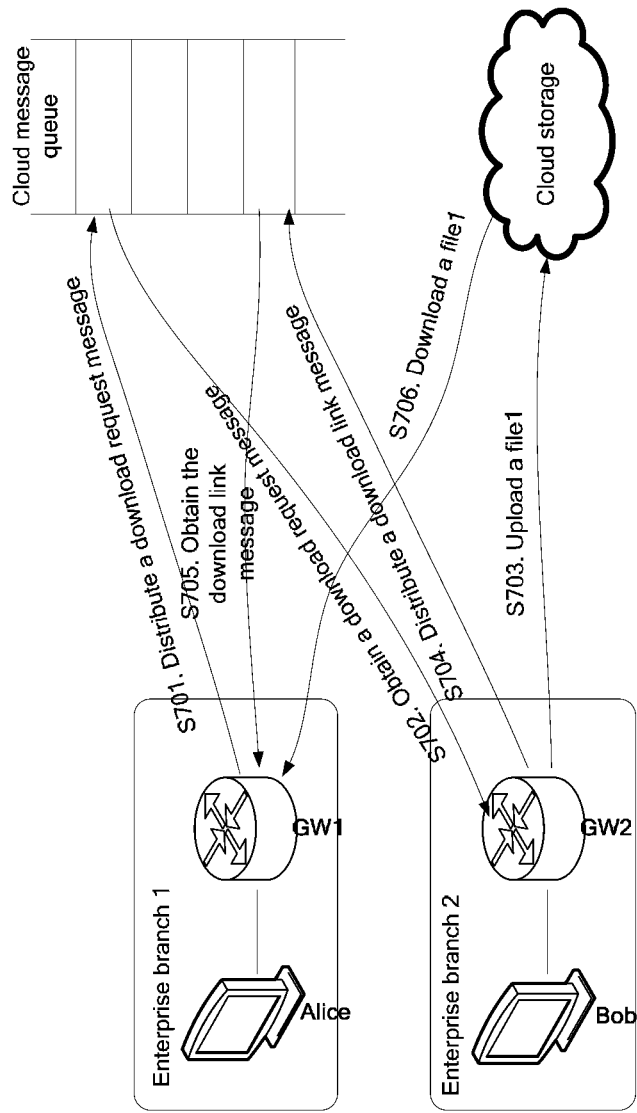
FIG. 8 is another interaction flowchart of a method for information synchronization between cloud storage gateways according to an embodiment of the present invention.

Referring to FIG. 7 and FIG. 8, FIG. 7 and FIG. 8 are interaction flowcharts (corresponding to FIG. 3 and FIG. 4) of a method for information synchronization between cloud storage gateways according to an embodiment of the present invention. Using the scenario shown in FIG. 1 as an example, the method includes:

S701. The GW1 sends a download request message to a cloud message queue (a cloud service provider).

The foregoing download request message carries an identifier (a file name or an ID) of a filet that is required to be downloaded and a gateway identifier of a gateway to which the fuel belongs.

S702. The GW2 obtains the download request message sent by the GW1.

S703. The GW2 uploads the file 1 to the cloud service provider.

S704. The GW2 distributes a download link message of a download link corresponding to the file 1 to the cloud message queue.

S705. The GW1 obtains the download link message.

S706. The GW1 downloads the file 1 according to the foregoing download link.

After downloading the file 1, the GW1 provides the file 1 to a file requesting party Bob within a branch of the enterprise.

Figure 9:
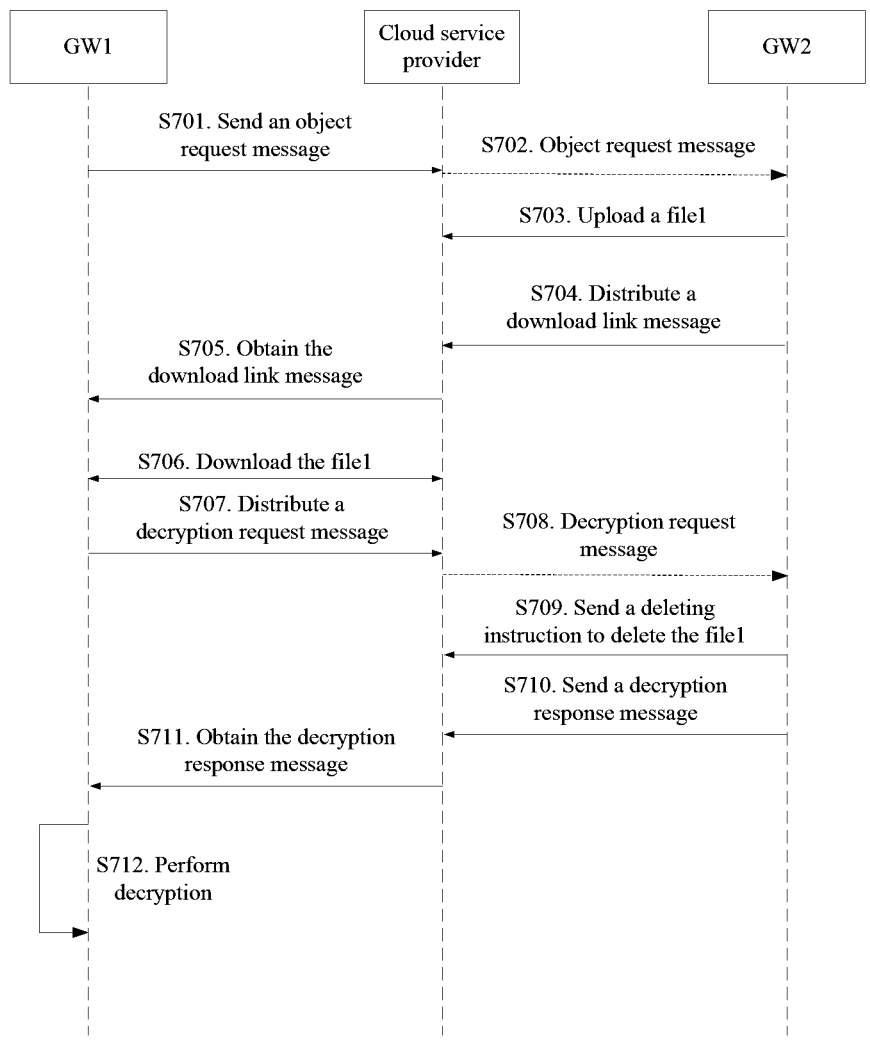
FIG. 9 is still another interaction flowchart of a method for information synchronization between cloud storage gateways according to an embodiment of the present invention.

If the file 1 is an encrypted file, referring to FIG. 9 (corresponding to FIG. 5 and FIG. 6), an interacting process between the cloud storage gateways is as follows:

S707. The GW1 distributes a decryption request message to the foregoing cloud message queue.

S708. The GW2 obtains the decryption request message.

S709. The GW2 sends a deleting instruction to the cloud service provider to delete the file 1.

S710. The GW2 sends a decryption response message to the foregoing cloud message queue.

S711. The GW1 obtains a decryption manner in the decryption response message as foregoing.

S712. Decrypt the file 1.

The decrypted file is provided to a file requesting party (Alice) within a branch of the enterprise.

The following introduces how to simulate a cloud message queue by means of a shared cache file.

To simulate a cloud message queue, an enterprise administrator needs to create a shared cache file within a cloud storage and set that all cloud storage gateways have write and read permissions on the shared cache file.

The shared cache file includes a queue information part and a queue message content part. The queue information part is used to store a message receiving offset and a message distributing offset; and the queue message content part is configured to store a message structure.

The message distributing offset is used to indicate a start position at which a massage is inserted in the queue message content part, while the message receiving offset is used to indicate a start position at which a massage is read from the queue message content part.

Alternatively, the message distributing offset may be considered as a write pointer, and the message receiving offset may be considered as a read pointer.

Figure 10:
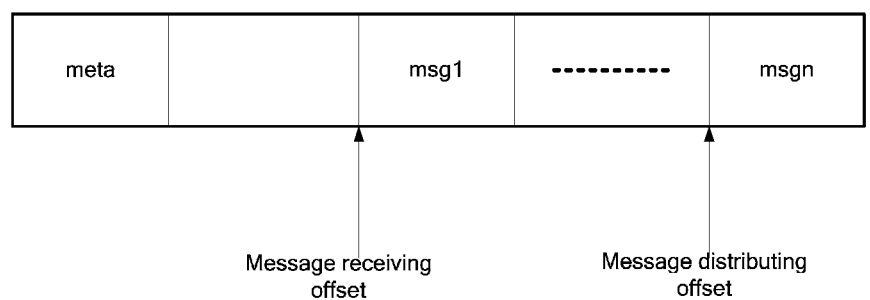
FIG. 10 is a schematic diagram of a shared cache file format according to an embodiment of the present invention.

More specifically, referring to FIG. 10, the shared cache file includes a metadata part and a message content part, where metadata is used to record the message receiving offset and the message distributing offset, and the message content part is used to store the message structure. The metadata corresponds to the foregoing queue information part, while the message content part corresponds to the foregoing queue message content.

In this embodiment, distributing a message is implemented by writing a message structure into a shared cache file. Each time a message structure is written, the write pointer is moved to an end position of the message structure.

Reading a message is implemented by reading a message structure from the read pointer.

Therefore, in this embodiment, the sending or distributing a message in all the foregoing embodiments may be implemented in the following manner querying a message distributing offset of a queue information part (metadata); and starting from the message distributing offset, performing an appending operation on a message structure, to insert a message; an end position of the appended message structure serves as a new message distributing offset.

The obtaining a message in all the foregoing embodiments may be implemented in the following manner:

finding a message receiving offset of a queue information part (metadata); and starting from the message receiving offset, reading one or more message structures.

A cloud storage gateway is further claimed in an embodiment of the present invention.

Figure 11:
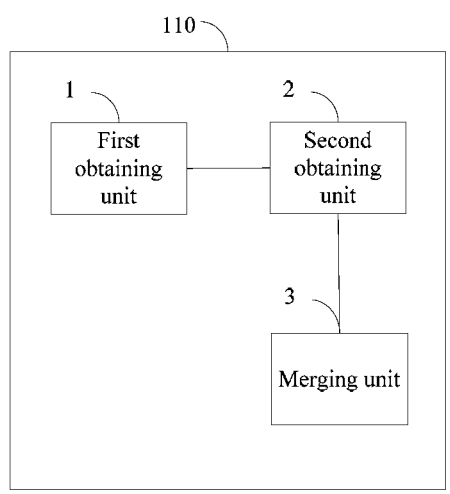
FIG. 11 is a schematic structural diagram of a cloud storage gateway according to an embodiment of the present invention.

Referring to FIG. 11, FIG. 11 is a cloud storage gateway according to an embodiment of the present invention, which is configured to implement any one of the methods shown in FIG. 2 to FIG. 10. As shown in FIG. 11, the cloud storage gateway 110 may include:

a first obtaining unit 1, configured to obtain, from a cloud message queue of a cloud service provider, a first directory message distributed by a second cloud storage gateway; for details about the first directory message, reference may be made to the foregoing descriptions, which are not described herein again;

a second obtaining unit 2, configured to obtain a cloud storage directory; and a merging unit 3, configured to merge a directory of a first cloud storage gateway, a directory of the second cloud storage gateway, and the cloud storage directory into one directory, and display the directory.

Figure 12:
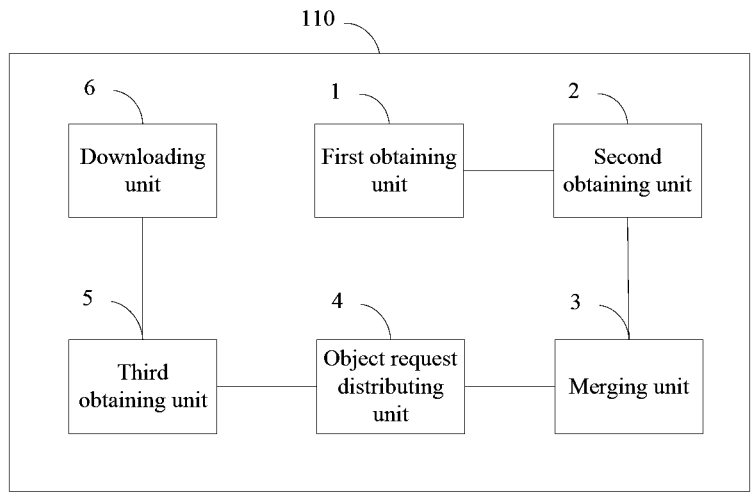
FIG. 12 is another schematic structural diagram of a cloud storage gateway according to an embodiment of the present invention.

In another embodiment of the present invention, referring to FIG. 12, the cloud storage gateway 110 in the foregoing embodiment may further include:

an object request distributing unit 4, configured to send a first download request message to the cloud message queue; where the first download request message includes an identifier of a first target object and a gateway identifier of the gateway to which the first target object belongs; for details, reference may be made to the foregoing descriptions, which are not described herein again;

a third obtaining unit 5, configured to obtain a first download link message from the cloud message queue;

for details about the first download link message, reference may be made to the foregoing descriptions, which are not described herein again; and a downloading unit 6, configured to download the first target object according to a download link corresponding to the first target object.

Figure 13:
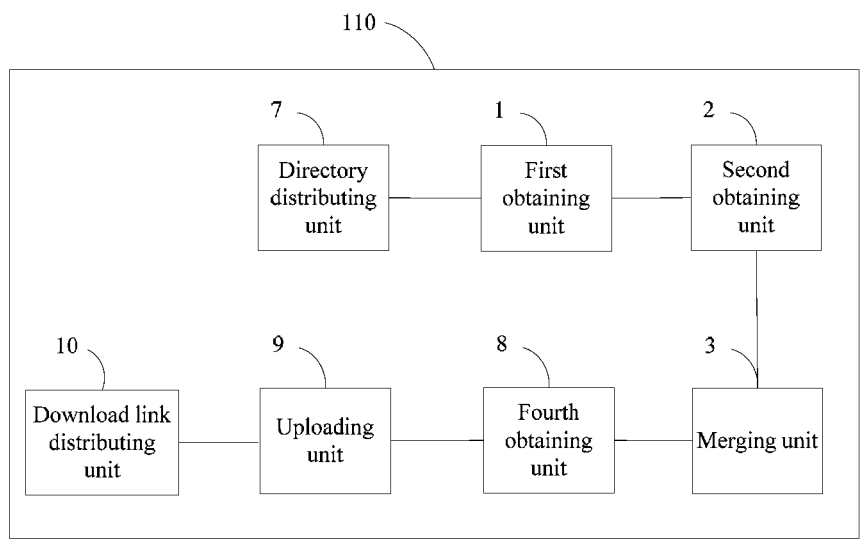
FIG. 13 is still another schematic structural diagram of a cloud storage gateway according to an embodiment of the present invention.

In another embodiment of the present invention, referring to FIG. 13, the cloud storage gateway 110 in all the foregoing embodiments may further include: a directory distributing unit 7, configured to send a second directory message to the cloud message queue of the cloud service provider, where the second directory message includes the directory of the first cloud storage gateway and a gateway identifier of the first cloud storage gateway. For details, reference may be made to the foregoing descriptions, which are not described herein again.

Figure 14:
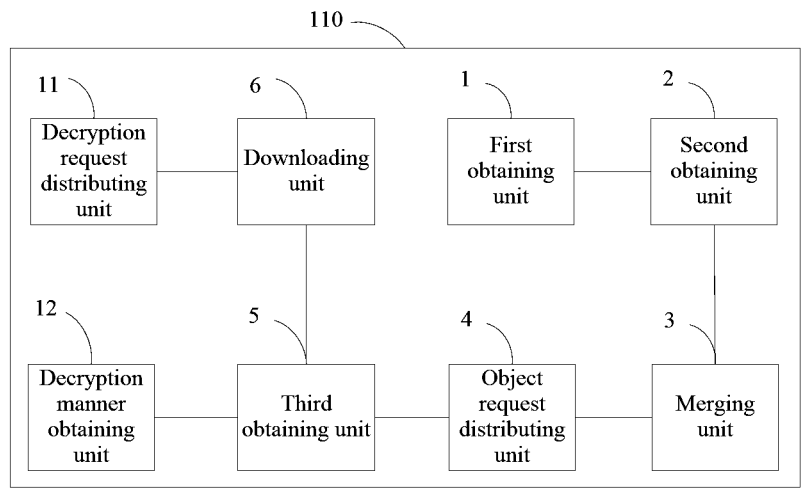
FIG. 14 is yet another schematic structural diagram of a cloud storage gateway according to an embodiment of the present invention.

In another embodiment of the present invention, referring to FIG. 14, the cloud storage gateway 110 in all the foregoing embodiments may further include:

a fourth obtaining unit 8, configured to obtain a second download request message from the cloud message queue; for details about the second download request message, reference may be made to the foregoing descriptions, which are not described herein again;

an uploading unit 9, configured to upload a second target object to the cloud service provider; and a download link distributing unit 10, configured to send a second download link message to the cloud message queue.

For details about the second download link message, reference may be made to the foregoing descriptions, which are not described herein again;

In another embodiment of the present invention, the cloud storage gateway 110 in all the foregoing embodiments may further include:

a download completion distributing unit, configured to distribute a download completion message to the cloud message queue.

In another embodiment of the present invention, the cloud storage gateway 110 in all the foregoing embodiments may further include:

a deleting instruction sending unit, configured to send a deleting instruction to the cloud service provider to delete the stored first target object.

In another embodiment of the present invention, to improve security, the foregoing first target object and second target object may be encrypted files. The cloud storage gateway 110 in all of the foregoing embodiments may further include:

a decryption request distributing unit 11, configured to distribute a decryption request message to the cloud message queue; for details about the decryption request message, reference may be made to the foregoing descriptions, which are not described herein again; and a decryption manner obtaining unit 12, configured to obtain a decryption response message from the cloud message queue and perform decryption according to a decryption manner in the decryption response message.

Figure 15:
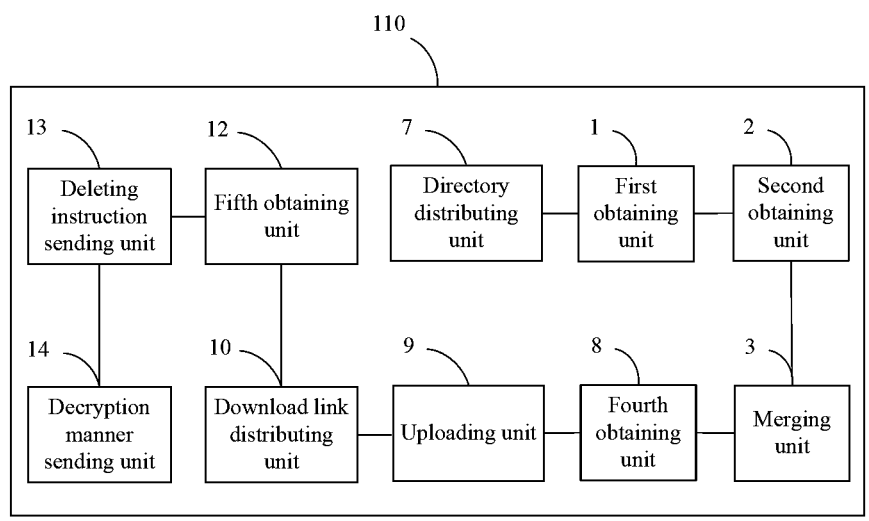
FIG. 15 is still yet another schematic structural diagram of a cloud storage gateway according to an embodiment of the present invention.

In another embodiment of the present invention, referring to FIG. 15, the cloud storage gateway 110 in all the foregoing embodiments may further include:

a fifth obtaining unit 12, configured to obtain a decryption request message from the cloud message queue;

a deleting instruction sending unit 13, configured to send a deleting instruction to the cloud service provider to delete the stored second target object; and a decryption manner sending unit 14, configured to distribute a decryption response message to the cloud message queue.

For related content, reference may be made to the foregoing descriptions of the method parts of this specification, which are not described herein again.

Figure 16:
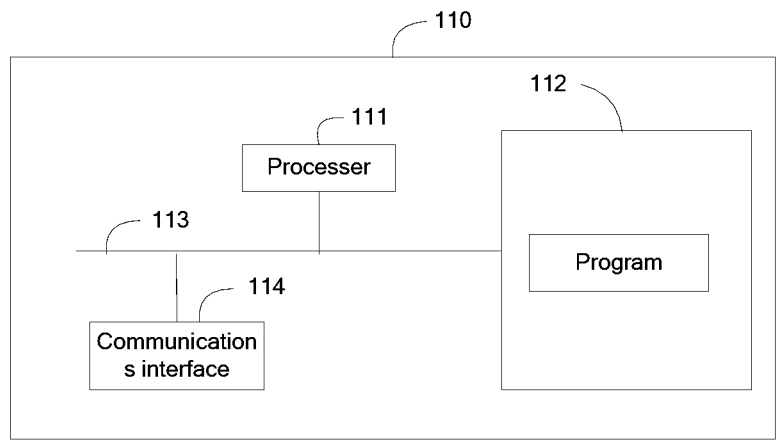
FIG. 16 is another schematic structural diagram of a cloud storage gateway according to an embodiment of the present invention.

FIG. 16 is a schematic structural diagram of hardware of the cloud storage gateway 110 according to an embodiment of the present invention. The cloud storage gateway 110 may include a processor 111, a memory 112, a bus 113, and a communications interface 114. The processor 111, the memory 112, and the communications interface 114 are connected to each other via the bus 113; the memory 112 is configured to store a program. Specifically, the program may include program code, and the program code includes a computer operation instruction.

The memory 112 may include a high-speed random access memory (random access memory, RAM for short), and may also include a non-volatile memory (non-volatile memory), for example, at least one disk memory.

The processor 111 may be a general-purpose processor, including a central processing unit (CPU), a network processor (NP), or the like; the processor 111 may also be a digital signal processor (DSP), an application-specific integrated circuit (ASIC), a field programmable gate arrays (FPGA) or another programmable logic device, a discrete gate or transistor logic device, or a discrete hardware component.

The processor 111 executes the program stored in the memory 112, for implementing a method for information synchronization between cloud storage gateways according to an embodiment of the present invention, where the method includes:

obtaining, from a cloud message queue of a cloud service provider, a first directory message distributed by a second cloud storage gateway, where the first directory message includes a directory of the second cloud storage gateway and a gateway identifier of the second cloud storage gateway;

obtaining a cloud storage directory; and merging a directory of the first cloud storage gateway, the directory of the second cloud storage gateway, and the cloud storage directory into one directory, and displaying the directory.

For details, reference may be made to the foregoing descriptions, which are not described herein again.

In another embodiment of the present invention, the processor 111 may further be configured to:

send a first download request message to a cloud message queue, where the first download request message includes an identifier of a first target object and a gateway identifier of the gateway to which the first target object belongs;

obtain a first download link message from the cloud message queue, where the first download link message includes a download link corresponding to the first target object, and is sent to the cloud message queue by the gateway to which the first target object belongs according to the first download request message; and download the first target object according to the download link corresponding to the first target object.

For details, reference may be made to the foregoing descriptions, which are not described herein again.

In another embodiment of the present invention, the processor 111 may further be configured to:

send a second directory message to the cloud message queue, where the second directory message includes the directory of the first cloud storage gateway and a gateway identifier of the first cloud storage gateway.

For details, reference may be made to the foregoing descriptions, which are not described herein again.

In another embodiment of the present invention, the processor 111 may further be configured to:

obtain a second download request message from the cloud message queue, where the second download request message includes an identifier of a second target object and a gateway identifier of the first cloud storage gateway;

upload the second target object to the cloud service provider; and send a second download link message to the cloud message queue, where the second download link message includes a download link corresponding to the second target object.

For details, reference may be made to the foregoing descriptions, which are not described herein again.

When the second target object is an encrypted file, in another embodiment of the present invention, the processor 111 may further be configured to:

obtain a decryption request message from the cloud message queue, where the decryption request message is used to request a decryption manner of the second target object;

send a deleting instruction to the cloud service provider to delete the second target object; and send a decryption response message to the cloud message queue, where the decryption response message includes the decryption manner of the second target object.

For details, reference may be made to the foregoing descriptions, which are not described herein again.

In addition, the foregoing cloud storage gateway 110 may also perform other steps involved in the method for information synchronization between cloud storage gateways and sub-steps of the steps introduced in this specification, which are not described here again.

In the present invention, the processor 111 and the memory 112 may be integrated into a same chip or may be two separate devices.

Figure 17:
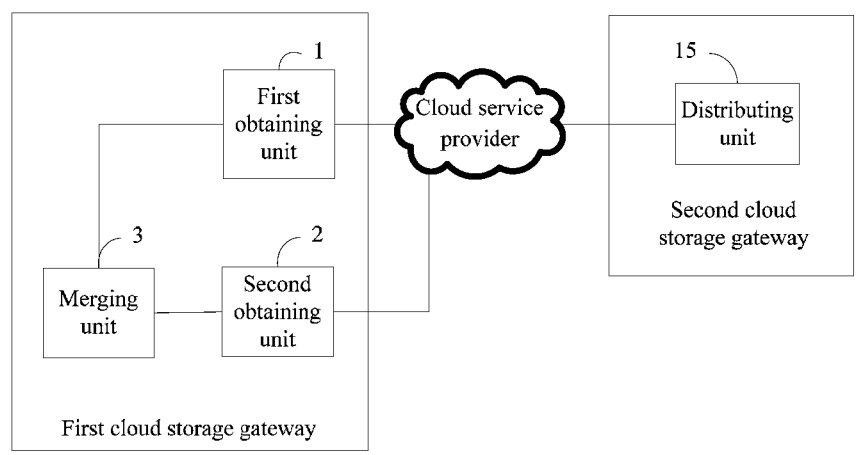
FIG. 17 is a schematic structural diagram of a system for information synchronization according to an embodiment of the present invention.

Referring to FIG. 17, a system for information synchronization is claimed in an embodiment of the present invention and may at least include a first cloud storage gateway and a second cloud storage gateway; and both the first cloud storage gateway and the second cloud storage gateway can communicate with a cloud service provider.

The first cloud storage gateway includes:

a first obtaining unit 1, configured to obtain, from a cloud message queue of a cloud service provider, a first directory message distributed by a second cloud storage gateway; for details about the first directory message, reference may be made to the foregoing descriptions, which are not described herein again;

a second obtaining unit 2, configured to obtain a cloud storage directory; and a merging unit 3, configured to merge a directory of a first cloud storage gateway, a directory of the second cloud storage gateway, and the cloud storage directory into one directory, and display the directory.

The second cloud storage gateway may at least include:

a distributing unit 15, configured to send a second directory message to the cloud message queue of the cloud service provider.

For a structure of the first cloud storage gateway or the second cloud storage gateway, reference may be made to the foregoing descriptions in FIG. 11 to FIG. 16, which are not described herein again.

In another embodiment of the present invention, the foregoing system may further include a cloud storage server, where the cloud storage server is configured to provide a cloud storage service. A cloud message queue may be maintained in the cloud storage server. When uploading and downloading files, cloud storage gateways communicate with the cloud storage server through an API.

In another embodiment of the present invention, the foregoing system may further include a queue server, where the queue server may be configured to provide a cloud message queue service. In this embodiment, a cloud message queue may be maintained in the queue server, and the cloud storage gateways may send and obtain a message by communicating with the queue server through an API. When uploading and downloading files, the cloud storage gateways may communicate with the cloud storage server through the API.

The embodiments in this specification are described in a progressive manner, mutual reference may be made to a same or similar part of the embodiments, and each embodiment focuses on differences from other embodiments.

In combination with the embodiments disclosed in this specification, method or algorithm steps may be implemented by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable disk, a CD-ROM, or a storage medium in any other forms well-known in the art.

The foregoing descriptions of the disclosed embodiments allow a person skilled in the art to implement or use the present invention. Multiple modifications made to these embodiments are apparent for a person skilled in the art. The general principle defined in this specification may be implemented in other embodiments without departing from the spirit or scope of the embodiments of the present invention. Therefore, the present invention is not limited to the embodiments described in this specification but extends to the widest scope that complies with the principle and novelty disclosed in this specification.

What is claimed is:

1. A method for information synchronization between a first cloud storage gateway for a first user branch and a second cloud storage gateway for a second user branch within an enterprise using both a cloud message queue of a cloud service provider and a cloud storage directory of the cloud service provider, the method comprising:

obtaining, by the first cloud storage gateway from the cloud service provider, a first directory message from the cloud message queue, wherein the first directory message was sent to the cloud service provider by the second cloud storage gateway and then stored by the cloud service provider on the cloud message queue, and wherein the first directory message stored on the cloud message queue comprises:
a directory of the second cloud storage gateway, and
a gateway identifier of the second cloud storage gateway;

obtaining, by the first cloud storage gateway, the cloud storage directory of the cloud service provider, wherein the cloud storage directory comprises a list of files stored on the cloud service provider; and merging, by the first cloud storage gateway in accordance with the first directory message and the cloud storage directory obtained from the cloud service provider, into a single new directory:
a directory of the first cloud storage gateway,
the directory of the second cloud storage gateway, and
the cloud storage directory; and displaying the single new directory.

2. The method according to claim 1, further comprising:

sending, by the first cloud storage gateway, a first download request message to the cloud message queue, wherein the first download request message comprises an identifier of a first target object and a gateway identifier of a gateway to which the first target object belongs;

obtaining, by the first cloud storage gateway, a first download link message from the cloud message queue, wherein the first download link message comprises a download link corresponding to the first target object, and sending, by the gateway to which the first target object belongs, the first download link message to the cloud message queue according to the first download request message; and downloading, by the first cloud storage gateway, the first target object according to the download link corresponding to the first target object.

3. The method according to claim 2, wherein the first target object is an encrypted file, and the method further comprises:
- sending, by the first cloud storage gateway, a first decryption request message to the cloud message queue, wherein the first decryption request message requests a decryption manner of the first target object;
- obtaining, by the first cloud storage gateway, a first decryption response message from the cloud message queue, wherein the first decryption response message comprises the decryption manner of the first target object; and
- decrypting, by the first cloud storage gateway, the first target object according to the decryption manner of the first target object in the first decryption response message.

4. The method according to claim 1, further comprising: sending, by the first cloud storage gateway, a second directory message to the cloud message queue, wherein the second directory message comprises the directory of the first cloud storage gateway and a gateway identifier of the first cloud storage gateway.

5. The method according to claim 4, further comprising:
- obtaining, by the first cloud storage gateway, a second download request message from the cloud message queue, wherein the second download request message comprises an identifier of a second target object and the gateway identifier of the first cloud storage gateway;
- uploading, by the first cloud storage gateway, the second target object to the cloud service provider; and
- sending, by the first cloud storage gateway, a second download link message to the cloud message queue, wherein the second download link message comprises a download link corresponding to the second target object.

6. The method according to claim 5, wherein:
the second target object is an encrypted file;
the method further comprises:
- obtaining, by the first cloud storage gateway, a second decryption request message from the cloud message queue, wherein the second decryption request message requests a decryption manner of the second target object;
- sending, by the first cloud storage gateway, a deleting instruction to the cloud service provider to delete the second target object; and
- sending, by the first cloud storage gateway, a second decryption response message to the cloud message queue, wherein the second decryption response message comprises the decryption manner of the second target object.

7. The method according to claim 5, further comprising:
setting, by the first cloud storage gateway, an expiration time for the download link corresponding to the second target object, so that the download link corresponding to the second target object becomes invalid after the expiration time.

8. The method according to claim 4,
wherein the sending by the first cloud storage gateway the second directory message to the cloud message queue comprises sending, by the first cloud storage gateway, the second directory message to the cloud message queue under a trigger condition; and
wherein the trigger condition comprises a directory of the first cloud storage gateway changes.

9. A first cloud storage gateway for a first user branch of an enterprise network, the cloud storage gateway comprising:
- a processing hardware; and
- a non-transitory computer-readable medium including computer-executable instructions that, when executed by the processing hardware, facilitate performing a gateway method for information synchronization between a first cloud storage gateway for the first user branch and a second cloud storage gateway for a second user branch within an enterprise using both a cloud message queue of a cloud service provider and a cloud storage directory of the cloud service provider, the gateway method comprising:
  - obtaining, by the first cloud storage gateway from the cloud service provider, a first directory message from the cloud message queue, wherein the first directory message was sent to the cloud service provider by the second cloud storage gateway and then stored by the cloud service provider on the cloud message queue, and wherein the first directory message stored on the cloud message queue comprises:
    - a directory of the second cloud storage gateway, and
    - a gateway identifier of the second cloud storage gateway;
  - obtaining, by the first cloud storage gateway, the cloud storage directory of the cloud service provider, wherein the cloud storage directory comprises a list of files stored on the cloud service provider; and
  - merging, by the first cloud storage gateway in accordance with the first directory message and the cloud storage directory obtained from the cloud service provider, into a single new directory:
    - a directory of the cloud storage gateway,
    - the directory of the second cloud storage gateway, and
    - the cloud storage directory, and displaying the single new directory.

10. The gateway according to claim 9, wherein the gateway is further configured to perform the gateway method comprising:
- sending a first download request message to the cloud message queue, wherein the first download request message comprises an identifier of a first target object and a gateway identifier of a gateway to which the first target object belongs;
- obtaining a first download link message from the cloud message queue, wherein the first download link message comprises a download link corresponding to the first target object, and the first download link message is sent to the cloud message queue by the gateway to which the first target object belongs according to the first download request message; and
- downloading the first target object according to the download link corresponding to the first target object.

11. The gateway according to claim 10, wherein the gateway is further configured to perform the gateway method comprising:
- sending a first decryption request message to the cloud message queue, wherein the first decryption request message requests a decryption manner of the first target object; and
- obtaining a first decryption response message from the cloud message queue, wherein the first decryption response message comprises the decryption manner of the first target object, and decrypt the first target object according to the decryption manner of the first target object in the first decryption response message.

12. The gateway according to claim 9, wherein the gateway is further configured to perform the gateway method comprising:
sending a second directory message to the cloud message queue, wherein the second directory message comprises the directory of the first cloud storage gateway and a gateway identifier of the first cloud storage gateway;
obtaining a second download request message from the cloud message queue, wherein the second download request message comprises an identifier of a second target object and the gateway identifier of the first cloud storage gateway;
an uploading unit, configured to upload the second target object to the cloud service provider; and
sending a second download link message to the cloud message queue, wherein the second download link message comprises a download link corresponding to the second target object.

13. The cloud storage gateway according to claim 12, wherein the gateway is further configured to perform the gateway method comprising:
obtaining a second decryption request message from the cloud message queue, wherein the second decryption request message requests a decryption manner of the second target object;
sending a deleting instruction to the cloud service provider to delete the second target object; and
sending a second decryption response message to the cloud message queue, wherein the second decryption response message comprises the decryption manner of the second target object.

14. The cloud storage gateway according to claim 12, wherein the sending comprises sending the second directory message to the cloud message queue under a trigger condition; and
wherein, the trigger condition comprises a directory of the cloud storage gateway changes.

15. A system for information synchronization, comprising a first cloud storage gateway for a first user branch within an enterprise, a second cloud storage gateway for a second user branch within the enterprise, and a cloud service provider including a cloud message queue and a cloud storage directory, wherein:
the first cloud storage gateway comprises:
a first processing hardware; and
a first non-transitory computer-readable medium including computer-executable instructions that, when executed by the processing hardware, facilitate performing a method for information synchronization between the first cloud storage gateway and the second cloud storage gateway using both the cloud message queue and the cloud storage directory of the cloud service provider, the method comprising:
obtaining, by the first cloud storage gateway from the cloud service provider, a first directory message from the cloud message queue, wherein the first directory message was sent to the cloud service provider by the second cloud storage gateway and then stored by the cloud service provider on the cloud message queue, and wherein the first directory message stored on the cloud message queue comprises:
a directory of the second cloud storage gateway, and
a gateway identifier of the second cloud storage gateway;
obtaining, by the first cloud storage gateway, the cloud storage directory of the cloud service provider, wherein the cloud storage directory comprises a list of files stored on the cloud service provider; and
merging, by the first cloud storage gateway in accordance with the first directory message and the cloud storage directory obtained from the cloud service provider, into a single new directory:
a directory of a first cloud storage gateway,
the directory of the second cloud storage gateway, and
the cloud storage directory, and
displaying the single new directory; and
the second cloud storage gateway comprises:
a second processing hardware; and
a second non-transitory computer-readable medium including computer-executable instructions that, when executed by the processing hardware, facilitate sending the first directory message to the cloud message queue.

16. The method according to claim 4,
wherein the sending by the first cloud storage gateway the second directory message to the cloud message queue comprises sending, by the first cloud storage gateway, the second directory message to the cloud message queue under a trigger condition; and
wherein the trigger condition comprises the first cloud storage gateway is powered on.

17. The method according to claim 4,
wherein the sending by the first cloud storage gateway the second directory message to the cloud message queue comprises sending, by the first cloud storage gateway, the second directory message to the cloud message queue under a trigger condition; and
wherein the trigger condition comprises a directory distributing request of another cloud storage gateway is received.

18. The cloud storage gateway according to claim 12,
wherein the sending comprises sending the second directory message to the cloud message queue under a trigger condition; and
wherein, the trigger condition comprises the cloud storage gateway is powered on.

19. The cloud storage gateway according to claim 12,
wherein the sending comprises sending the second directory message to the cloud message queue under a trigger condition; and
wherein, the trigger condition comprises a directory distributing request of another cloud storage gateway is received.

* * * * *